Patented Aug. 14, 1928.

1,680,660

UNITED STATES PATENT OFFICE.

LOUIS BERMAN, OF NEW YORK, N. Y.

PARATHYROID PRODUCT.

No Drawing.   Application filed August 11, 1925. Serial No. 49,643.

This invention relates to new parathyroid products and processes of preparing the same for parathyroid glands.

In my prior applications, Serial Numbers 712,552, filed May 12, 1924, and 715,057, filed May 22, 1924, I have described the production of new parathyroid products from the parathyroid glands: these new products possessing the physiological properties of increasing the calcium content of the blood and decreasing nervous irritability.

The present invention relates to an improved process of making the new parathyroid product which I designate parathyrin.

The following more detailed description will illustrate the improved method of the present invention:

The parathyroid glands of oxen are first carefully trimmed of fat and surrounding tissue and are then reduced to a fine pulp in a hasher or meat chopper or other suitable hasher or comminuting device. The comminuted glands are mixed in a suitable glass vessel with about twenty times their volume of 5% meta-phosphoric acid and the mixture is placed over a water bath and heated with stirring for about two hours, and the resulting mixture is then filtered. The filtrate is neutralized with sodium hydroxide solution and the resulting precipitate is filtered off. The filtrate is then chilled by being placed on ice for about twenty minutes. To this is then added a sufficient quantity of 40% sodium hydroxide solution to make the reaction strongly alkaline to litmus and sufficient to cause the appearance of slight turbidity. The solution is then allowed to stand over night on the ice. This causes the separation of most of the disodium hydrogen phosphate as a gel. This gel is broken up and filtered and the filtrate is neutralized with concentrated hydrochloric acid carefully added. The neutralized fluid is then concentrated to a small volume by evaporation. Most of the sodium chloride and residual disodium hydrogen phosphate separate off. The solution is now filtered and a chloride determination made on the filtrate and the filtrate then diluted with distilled water to give a concentration of 0.9% sodium chloride.

The solution thus obtained does not contain protein, reacting negatively to the biuret test. It contains no toxic or injurious material, as shown by the results of animal experiments. It may be preserved on ice or by the addition of an antiseptic such as chlor-butanol. This solution is a solution of the active principle parathyrin of the parathyroid glands and can be injected either subcutaneously or intravaneously to obtain the effects appearing in normal or parathyroid ectomized animals. It increases the calcium content of the blood, decreases electrical irritability of the nerves and relieves the symptoms of tetany when given in suitable doses.

I claim:

1. The method of treating comminuted parathyroid glands which comprises extracting with an aqueous solution of meta-phosphoric acid.

2. The method of producing a parathyroid product from the parathyroid glands which comprises extracting the comminuted glands with water containing meta-phosphoric acid, neutralizing the resulting extract and filtering off the precipitate formed, rendering the solution strongly alkaline and permitting it to stand in the form of a gel, filtering the solution from the gel and neutralizing the same, and then concentrating the solution to remove inorganic salts.

3. The method of producing a parathyroid product from the parathyroid glands which comprises extracting the comminuted glands with water containing meta-phosphoric acid and treating the aqueous extract to separate proteins therefrom.

4. The method of producing a parathyroid product from the parathyroid glands which comprises extracting the comminuted glands with water containing meta-phosphoric acid and treating the aqueous extract to separate proteins therefrom, such treatment including neutralization of the solution with sodium hydroxide and filtering off of the precipitate, rendering the solution alkaline and forming a phosphate gel, filtering the liquid from the gel and neutralizing the filtrate.

5. The method of producing a parathyroid product from the parathyroid glands which comprises extracting the comminuted glands with a water solution of meta-phosphoric acid and treating the resulting solution to separate proteins therefrom, such treatment including the formation of a phosphate gel and the separation of the solution from the gel.

6. The method of treating an aqueous meta-phosphoric acid extract of parathyroid glands which comprises treating the extract to form a phosphate gel therein and separating the liquor from the gel.

7. The method of treating an aqueous meta-phosphoric acid extract of parathyroid glands which comprises treating the extract to form a phosphate gel therein and separating the liquor from the gel, together with a subsequent treatment of the liquor by neutralization and concentration.

In testimony whereof I affix my signature.

LOUIS BERMAN.